United States Patent [19]

Long et al.

[11] Patent Number: 5,197,147
[45] Date of Patent: Mar. 23, 1993

[54] KEYCODE TRANSLATION SYSTEM FOR PRODUCING TRANSLATED KEYCODE SIGNALS RESPONSIVE TO KEYBOARD SIGNALS WHICH ACT AS A POINTER TO KEYCODE TRANSLATION TABLE

[75] Inventors: Marty L. Long, Mesa; Henry Wurzburg, Chandler, both of Ariz.

[73] Assignee: VLSI Technology, Inc., San Jose, Calif.

[21] Appl. No.: 474,917

[22] Filed: Feb. 5, 1990

[51] Int. Cl.[5] .............................................. G06F 15/02
[52] U.S. Cl. ................................ 395/500; 364/709.12; 364/228; 364/228.3; 364/242
[58] Field of Search ............... 395/425, 500; 380/4; 364/709.12

[56] References Cited

U.S. PATENT DOCUMENTS 4,942,606  7/1990  Kaiser et al. .......................... 380/4
4,959,860  9/1990  Watters et al. ........................ 380/4

Primary Examiner—Thomas C. Lee
Assistant Examiner—Mehmet Geckil
Attorney, Agent, or Firm—LaValle D. Ptak

[57] ABSTRACT

A keycode translation system is disclosed in the form of a hardware system for providing translation between the keycode sent to the keyboard controller of a computer, such as a personal computer, and the code sent from the keyboard controller to the CPU of the computer for processing. A control ROM is used to select translated keycode signals from a keycode look-up table under the control of a program counter and keycode signals from the keyboard. These translated signals then are supplied through an accumulator to the CPU of the computer.

11 Claims, 1 Drawing Sheet

KEYCODE TRANSLATION SYSTEM FOR PRODUCING TRANSLATED KEYCODE SIGNALS RESPONSIVE TO KEYBOARD SIGNALS WHICH ACT AS A POINTER TO KEYCODE TRANSLATION TABLE

BACKGROUND

Personal computers (PC's) typically require a code translation between the keycode which is sent to the keyboard controller by the keyboard and the code which is then sent from the controller to the central processing unit (CPU) of the PC for processing. In addition, the translation required varies, depending upon the particular make and model of PC which is interfaced with the keyboard. Most currently available keyboards produce a hexadecimal encoded data output. The data encoded for use within PC's, however, typically is the same as used for older XT style keyboards, thereby necessitating a code translation between the output of the keyboard and the input of the CPU of the computer.

The most popular personal computers currently are manufactured by the IBM Corporation, and two highly popular types of such IBM personal computers are those which carry the designations "AT" and "PS/2". Even though both of these computers are made by the same manufacturer, the translation of the signals which are supplied from the keyboard to the computer occurs at different operating times; and in addition, at least some of the translations for some of the keys are different. Consequently, a keyboard which is configured to communicate with an AT computer cannot be used with a PS/2 computer and vice-versa.

In the past, keycode translation has been performed in software by using a look-up table or by a separate translation ROM under hardware or software control. The look-up table resides in the control code ROM address space, consequently using space that otherwise could be used for additional code. This effectively reduces the usable size of the control code ROM.

When a dedicated translation ROM is used, available chip real estate is reduced because separate read/write circuitry from the control ROM is required.

Personal computer keyboards communicate with a keyboard controller with a ROM for utilization in the operation of the controller. Typical currently available universal peripheral controllers use some of the keyboard controller ROM for the look-up tables necessary for effective keycode translation. These tables can use approximately twenty-five (25%) percent of the keyboard controller ROM which means that this memory is unavailable for programmers to use for other purposes.

It is desirable to provide a keycode translation system which does not require a portion of the controller ROM space, which is capable of effective keycode translation for different types of personal computers, and which is of small physical size without requiring a separate ROM.

SUMMARY OF THE INVENTION

It is an object of this invention to provide an improved keycode translation system.

It is another object of this invention to provide an improved universal keycode translation system.

It is an additional object of this invention to provide a keycode translation system as a single chip including an on-chip ROM for supporting the necessary command sets and conversion code.

It is a further object of this invention to provide an improved keycode translation system in a single chip incorporating an on-chip ROM and capable of effecting keycode translations for utilization with at least two different types of personal computers.

In accordance with the preferred embodiment of this invention, a keycode translation system receives keycode signals from a keyboard and translates those signals to a form for operation in a personal computer. The system includes a control ROM with associated keycode tables for effecting the desired translation in response to address signals applied to the control ROM. Address signals are supplied through a multiplex circuit which is coupled with a program counter, for controlling the program operation, and a keyboard signal supply, for producing the keyboard output signals to be translated. The output of the control ROM supplies the translated signals to an accumulator for temporary storage. The translated signals then are supplied from the accumulator under control of an arithmetic logic unit (ALU) in a keyboard controller.

DETAILED DESCRIPTION

Figure 1:
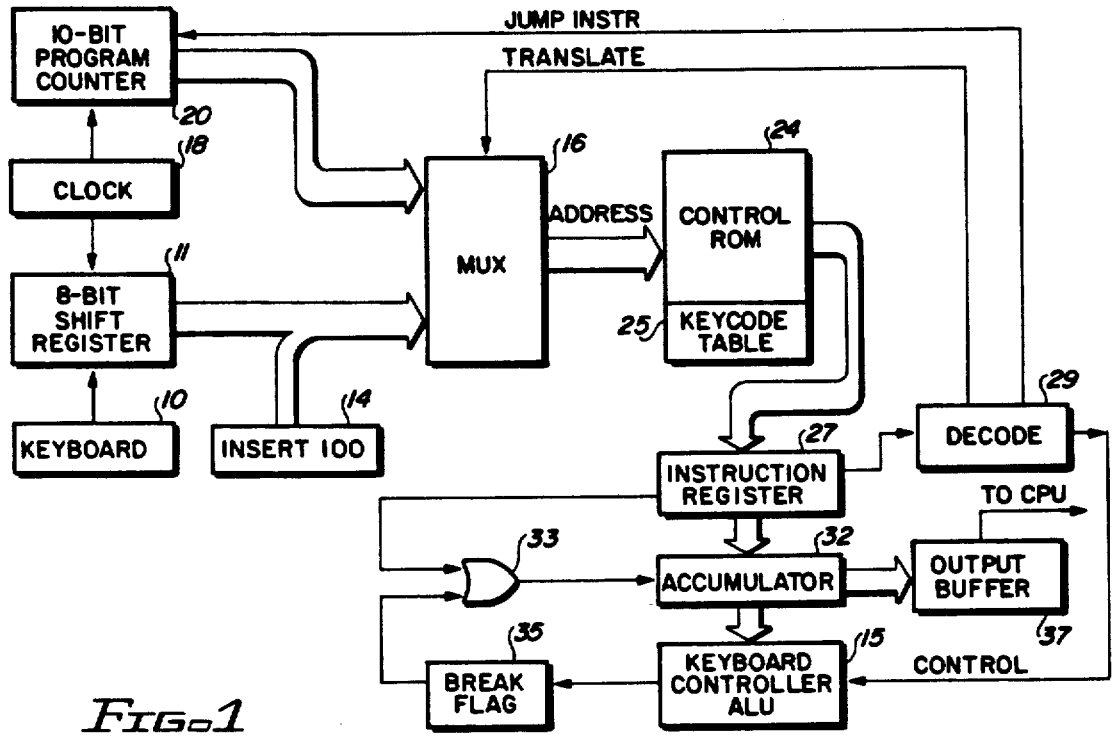
FIG. 1 is a block diagram of a preferred embodiment of the invention.

Reference now should be made to the drawing, in which FIG. 1 is a block diagram of a preferred embodiment of the invention. The system shown in FIG. 1 is a keycode translation system for translating signals obtained from a keyboard 10 to a form for utilization in a personal computer. With the exception of the keyboard 10 shown in FIG. 1, all of the remaining elements of the circuit shown in FIG. 1 are formed as part of a single large scale integrated circuit chip. The keyboard 10 may be of any suitable type for utilization with personal computers, and a specific application of the circuit of FIG. 1 is to effect a keycode translation of the signals from the keyboard 10 (typically hexadecimal encoded signals) and two highly popular personal computers, namely the IBM PC/AT and the IBM PS/2.

Although the command sets for both of these computers are substantially the same, several specific differences exist; so that the keycode translation for the two computers is not identical. The operation of the system shown in FIG. 1, however, is the same irrespective of which of the two computers is provided with the system output through the keyboard controller 15.

When signals indicative of a key selection by a keyboard 10 are made, they are transferred in series to an eight-bit shift register 11 under the control of a clock 18, which synchronizes the operation of the entire system shown in FIG. 1. The various clock interconnections to the different circuit blocks have not been shown since such interconnections are common and well-known. The data from the keyboard 10 is supplied in serial and comprises eight-bits per key selection.

It should be noted that within the keyboard 10 a start-bit, a parity bit and a stop-bit also are added to the eight data bits of information generated by each operation of the key in the keyboard. This information then is processed within the keyboard transmitter, but only the eight data bits are supplied in series from the keyboard 10 to the eight-bit shift register 11 of the circuit shown in FIG. 1.

When all eight data bits of a keycode signal are stored in the shift register 11, these bits are supplied in parallel to a multiplex circuit 16 and have added to them three additional bits "100" from a circuit 14. The eight least significant bits of the eleven-bit address supplied through the multiplex circuit 16 comprise the data bits and the three most significant bits of the total eleven-bit address comprise the bits "100" added by the circuit 14. The multiplex circuit 16 then supplies this eleven-bit keycode address signal to a control ROM 24.

The control ROM 24 continuously and sequentially steps through the various ROM addresses in it and supplies those addresses to an instruction register 27. This operation is synchronized with the operation of the program counter (PC) with which the system is used. With each clock, the PC (circuit 20) is incremented by one, generating sequential addresses to the ROM 24 (in a conventional manner not shown). Each clock causes the PC to increment to a new address, pointing to the next location in the ROM 24. The address supplied by the ten-bit program counter 20 always has a "0" bit added to the ten-bits, as the most significant bit of the address, which then is supplied to the multiplex circuit 16 as an eleven-bit address for the control ROM 24. It should be noted that whenever an address supplied through the multiplex circuit 16 to the control ROM 24 is obtained from the counter 20, the most significant bit of that address is a binary "0". Similarly, whenever an address representative of a key operation in the keyboard 10 is supplied through the multiplex circuit 16 to the control ROM 24, the most significant bit of that eleven-bit address is a binary "1". Consequently, the system readily distinguishes between operating addresses under the control of the counter 20 and data or keycode addresses initiated by operation of a key in the keyboard 10.

The normal sequential operation of the ROM 24 provides output signals to the instruction register 27 which are decoded to determine the action to be taken by the ALU of the keyboard controller. Most of these instructions involve arithmetic operations to be performed on the accumulator 32 (a separate register which resides on the same chip as the rest of the circuit of FIG. 1) or data movement from the accumulator to another register or vice-versa. These are common, well-known instructions; and the implementation of these instructions and the manner in which they effect various operations within the overall system, are common and well-known. For that reason, these operations are not discussed here.

Normally the signals which pass through the multiplex circuit 16 comprise the sequential program signals from the program counter 20. Whenever the PC 20 points to an address location in the control ROM 24 which contains a translate (XLATE) instruction, that instruction is decoded by the instruction register 27 supplied through a decoder 29 as a "translate" instruction to the multiplex circuit 16. The PC itself stores the incremented address in a temporary register called the stack (not shown). When this "translate" signal is supplied from the decode circuit 29 to the multiplex circuit 16, the contents of the shift register 11, to which the three most significant data bits "100" have been added, are supplied in parallel to the control ROM 24 as a keycode address. The ROM 24 address uses only the eight-data bits (the eight least significant bits of the address supplied by the multiplex circuit 16) from the register 11.

The address data corresponding to the operated key in the keyboard 10 causes an internal operation in the ROM 24 to select a corresponding translated character from a keycode table 25 (forming a separate part of the control ROM 24) in accordance with the character format required by the CPU of the personal computer with which the system is being used. The translated character is supplied from the keycode table 25 of the control ROM 24 through the instruction register 27 to the accumulator 32. The particular character which is supplied from the control ROM 24, as determined from the keycode table 25, corresponds to a preestablished switched setting to select either the PC/AT mode of operation or the PC/2 mode of operation. This is a simple switched selection which may be effected in any suitable manner (not shown). The keycode table 25 has sufficient capacity (128 bytes) to effect this provision for those translated signals which are different for the two different types of computer systems. It is important to note that no separate read/write circuitry is necessary, since the contents of the keyboard function as a pointer to the keycode table appended to the control ROM. This table is not located in the control ROM address space, so that once the proper address is located under control of the program counter 20, the translated eight-bit signal is supplied directly from the ROM 24 to an instruction register 27.

The most significant bit (MSB) of the translated signal in the instruction register 27 is supplied as an enabling signal to a coincidence gate 33, the output of which is coupled as a sequential control signal to an accumulator 32. The translated signal, which is temporarily stored in the instruction register 27, appears on the output of the instruction register 27 as a parallel eight-bit signal connected to the input of the accumulator 32. The translated signal ultimately is supplied from the accumulator 32 to the personal computer (not shown) through an output buffer 37. Typically, each of these translated characters are encoded in hexadecimal code, although other codes used for operating other systems also could be employed. For the system under consideration, hexadecimal bytes are provided by the output of the translation system.

Whenever a new translated signal is supplied to the instruction register 27, the decode circuit 29 responds to that signal and supplies a control signal to an internal keyboard controller ALU 15 to indicate that additional keycode inputs are available for processing. The internal keyboard controller ALU 15 provides a break code flag 35 in response to keyboard release. This "flag" is coupled to the other input of the coincidence gate 33, which then produces an output to the accumulator 32 to store the signal appearing on its input from the instruction register 27. Once the data has been transferred to the accumulator 32, the parallel eight-bit byte is stored in the accumulator 32 and is available for processing by the internal ALU 15. The accumulator 32 functions as a buffer storage of the translated keycode signals and typically has capacity for the storage of one byte of data. As mentioned previously, this byte also is supplied to the output buffer 37.

The foregoing sequence of operation continues under the coordination of the synchronized clock of the computer, including the internal ALU 15, and the clock 18 illustrated in FIG. 1. This occurs each time the control ROM comes to an address containing the XLATE instruction.

Figure 2:
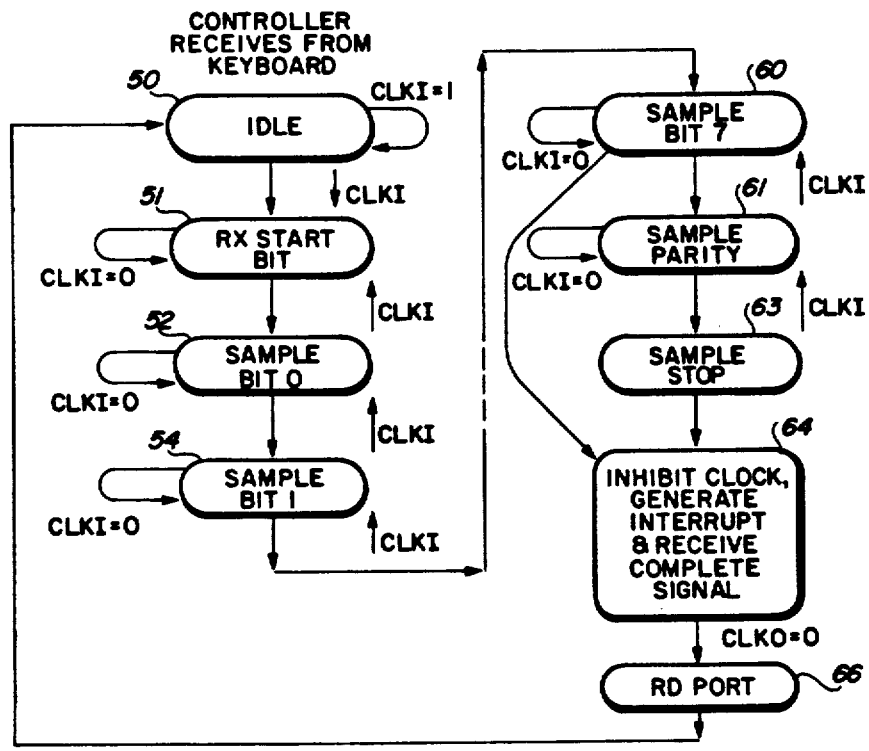
FIG. 2 is a flow-chart, illustrating a portion of the operation of the circuit of FIG. 1.

FIG. 2 is a flow chart of the controller operation receiver as it receives data from the keyboard 10 to produce the data which ultimately is supplied to the shift register 11. So long as no key is operated on the keyboard 10, the controller of FIG. 2 is in an idle condition of operation 50, as illustrated. Once a signal is available from the keyboard, as evidenced by the operation of a key, a start/stop parity circuit in the receiver (not shown) operates in a conventional manner to add a start-bit 51, as indicated. Then the eight data bits corresponding to the operated key are sampled in sequence, as illustrated in blocks 52, 54, and 60 (representative of bits 0, 1 and 7, respectively). At 61, the sample of the parity count of the eight data bits is made, and a parity check bit is added. At 63, the stop-bit is added, and at 64 the interrupt is produced for transferring the keyboard signal to the system shown in FIG. 1. This interrupt operates the break flag 35 to initiate the XLATE operation of the control ROM 24 to effect the operation of the system of FIG. 1, described previously. After the transfer of the data in this manner, the system is recycled back to the idle condition 50 until the next operation of a key in the keyboard 10 initiates another cycle of operation.

The foregoing description of the preferred embodiment of the invention is to be considered as illustrative and not as limiting. Various changes and modifications will occur to those skilled in the art without departing from the true scope of the invention, as set forth in the appended claims.

We claim:

1. A keycode translation system for receiving keycode signals in one form from a keyboard and translating such keycode signals to another form for operation in a computer, said system including in combination;

a program counter for supplying operating addresses having a most significant bit of a first binary type;

keyboard signal supply means for supplying signals corresponding to the selection of keys on a keyboard and having a most significant bit of a second binary type different from said first binary type;

multiplex circuit means coupled with said program counter for receiving address signals and said keyboard signal supply means for receiving keycode signals which act as pointers to a keyboard translation table and for producing address signals on the output thereof;

accumulator means for storing translated signals;

control ROM means connected to the output of said multiplex circuit means;

decoder means coupled with said control ROM means for supplying translate instruction signals to said multiplex circuit means to produce address signals on the output thereof corresponding to signals from said keyboard signals supply means;

a keycode translation table means appended to said control ROM means, wherein address signals having a most significant bit of said second binary type appearing on the output of said multiplex circuit means cause said control ROM means to select translated keycode signals from said keycode translation table means corresponding to said translated keycode signals for supplying such translated keycode signals corresponding to signals from said keyboard signal supply means to said accumulator means for temporary storage therein; and means for receiving said translated keycode signals for operation in response thereto.

2. The combination according to claim 2 wherein said program counter provides signals through said multiplex circuit means to said control ROM means for operating said control ROM means.

3. The combination according to claim 2 further including instruction register means interconnected between the output of said control ROM means and said accumulator means; break flag coincidence gate means enabled by a predetermined output of said instruction register means and coupled to said accumulator for providing control signals thereto for enabling said accumulator means to respond to and to receive data from said control ROM means; and break flag signal means coupled to said break flag gate means for operating said gate means to produce said control signals for said accumulator means.

4. The combination according to claim 3 wherein said signals supplied from said control ROM means to said instruction register means are supplied as a predetermined number of bits in parallel, with one of such bits comprising the most significant bit (MSB), said most significant bit being supplied to said gate means as said predetermined output to enable said coincidence gate means, and the remainder of said bits being supplied in parallel to said accumulator means for storage therein.

5. The combination according to claim 4 wherein said keycode table is encoded to provide translated keycode signals which are compatible with the operation of the computer means with which said keycode translation system is used.

6. The combination according to claim 5 further including clock means for synchronizing the operation of said keycode translation system.

7. The combination according to claim 1 wherein said keycode table is encoded to provide translated keycode signals which are compatible with the operation of the computer means with which said keycode translation system is used.

8. The combination according to claim 1 further including instruction register means interconnected between the output of said control ROM means and said accumulator means; break flag coincidence gate means enabled by a predetermined output of said instruction register means and coupled to said accumulator for providing control signals thereto for enabling said accumulator means to respond to and to receive data from said control ROM means; and break flag signal means coupled to said break flag gate means for operating said gate means to produce said control signals for enabling said accumulator means.

9. The combination according to claim 8 wherein said signals supplied from said control ROM means to said instruction register means are supplied as a predetermined number of bits in parallel, with one of such bits comprising the most significant bit (MSB), said most significant bit being supplied to said gate means as said predetermined output to enable said coincidence gate means, and the remainder of said bits being supplied in parallel to said accumulator means for storage therein.

10. The combination according to claim 1 wherein said program counter provides signals through said multiplex circuit means to said control ROM means for operating said control ROM means.

11. The combination according to claim 1 further including clock means for synchronizing the operation of said keycode translation system.

* * * * *